Nov. 3, 1942.  N. E. WOLFARD  2,300,851
EARTH PULVERIZER
Filed Dec. 14, 1939

NOAH ELLSWORTH WOLFARD
INVENTOR

BY Hubert Miller
ATTORNEY

Patented Nov. 3, 1942

2,300,851

UNITED STATES PATENT OFFICE 2,300,851

EARTH PULVERIZER

Noah Ellsworth Wolfard, Norman, Okla.

Application December 14, 1939, Serial No. 309,206

5 Claims. (Cl. 55—21)

My invention relates to improvement in machines for pulverizing and mulching earth in natural or modified state. It is the object of the invention to provide a machine of this type which will not only pulverize earth, but which will compact commercial and industrial mixtures, by-products, and residues when spread out on any comparatively flat base over which the machine can be propelled. It may also be employed in breaking up or "mincing" vegetation such as weeds, shrubbery, undergrowth, corn and cotton stalks, surface roots, and the like.

Another object of the invention is to provide a machine of this type which has twin rotating cylinders each bearing a plurality of cutting or compacting blades disposed helically, and which blades are so meshed that one cylinder cleans the blades of the other as the work progresses.

The details on the construction of a preferred form of my invention, together with other objects attending its production, will be better understood from the following description when read in connection with the accompanying drawing, which is chosen for illustrative purposes only, and in which Figure 1 is a top plan view of a machine embodying the invention, with longitudinal sections of each of the rollers cut away to show details of construction and assembly;

Figure 4:
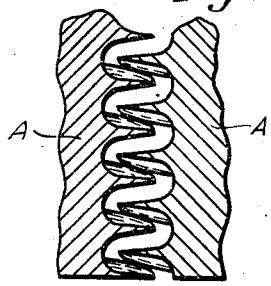
Fig. 4 is an enlarged fragmentary sectional view showing the manner in which the helical ribs on the two rollers mesh and clean themselves.

The invention includes twin right circular cylinders AA, preferably hollow, which carry multiple helical blades which may either be cast integral with the cylinders or attached to the surface thereof by any suitable means. These blades may be of any desired height and spacing with hyperbolic or any other generally conic type of cross section of trough, and of such relative dimensions of blade to trough that crushing of lumps within the troughs will result, in addition to the pulverizing action of the blades during their contact with the material over which the unit is being propelled. The helical blades and troughs in each cylinder are of identical lead, hand, shape and size, and when their rotation is synchronized the cylinders will roll freely along the ground both turning in the same direction with each blade meshing in its companion trough on the other cylinder, and the side edges of the blades on each cylinder will scrape along the side edges of the corresponding blades on the other cylinder, as shown in Fig. 4, thus cleaning off material which may stick to the side walls of each blade.

So long as the pitch lead (which is the distance between parallel planes each passing thru one end of the chord of mesh and perpendicular to the cylinder axes), does not exceed one-half the divided pitch or right spacing of the helical blades plus twice the thickness of the blade edge, the divided pitch or axially measured spacing of the blades may be increased or decreased as desired, and the rollers will mesh and roll in the same direction without either interfering with the other. As will be understood by those familiar with the art, this general relation can be maintained by varying the total depth of mesh of the blades, and this depth can be better adjusted by practical experiment than by theoretical and mathematical calculation and measurement.

If made hollow, as illustrated, the ends of the cylinders will be milled to tightly receive heads B and C which may be removed if desired to introduce water, sand, or other material to vary the weight of the cylinders. Identical sprocket gears G are concentrically secured to the heads B and are connected together by means of a chain F. This chain and its sprockets serve to synchronize the rotation of the two rollers regardless of the terrain over which the machine travels. Identical axles D pass axially thru the cylinder heads B and C of each cylinder, and the opposite ends of these axles are journaled in opposite sides of a frame E, which serves to maintain the spacing between the rollers, and consequently the depth of mesh of the blades. This frame preferably has a hitch at each of its ends to facilitate its propulsion over the ground, and also to allow several such units to be hooked in tandem.

Figure 1:
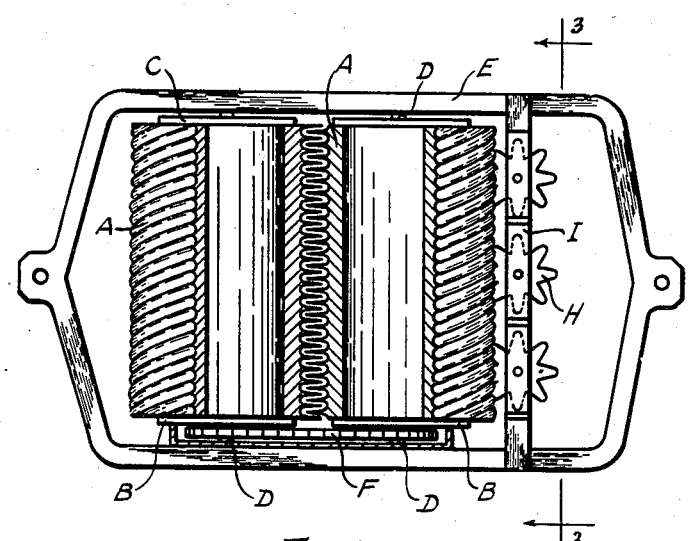
Figure 3:
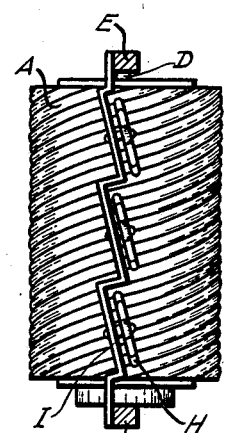
Fig. 3 is a rear end view of the machine with a part of the frame cut away along the line 3—3 of Fig. 1.
Figure 2:
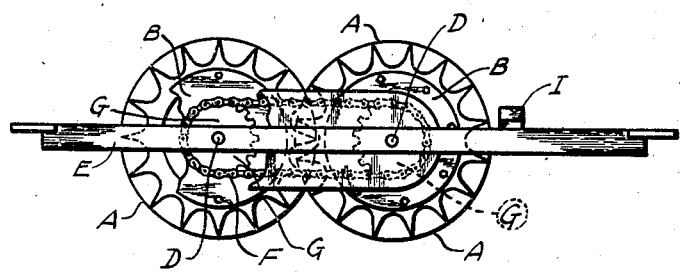
Fig. 2 is a side elevation of the same machine with parts cut away to disclose construction.

As a means of thoroughly cleaning the blades and troughs on the rear cylinder I provide a plurality of petal type scrapers mounted for free rotation on a "lazy Z" beam I, the opposite ends of which are in turn mounted rigidly on opposite sides of the frame E, as clearly shown in both Figs. 1 and 3. The petals of these scrapers are of a shape similar to the cross sectional shape of the troughs between the blades, and of slightly smaller dimensions. The scraper petals are thus designed to mesh in the troughs while the side walls of the troughs force the scraper to rotate as the cylinder rotates. The number and spacing of the scrapers is preferably such that all troughs will be cleaned as the cylinders rotate. They are mounted in such a manner on the "lazy Z" beam that the plane of each scraper wheel is normal to the tangent of the blade helices. The cleaning action of the scrapers is due to the oblique relation of the respective axes of rotation of scraper and cylinder.

Having fully described the construction and operation of the invention, together with its objects, what I claim is:

1. An earth pulverizer comprising the combination of: a main frame having spaced side members; a plurality of rollers journaled therein with their axes parallel; and a plurality of spaced helically disposed blades or ribs carried by each of said rollers, all of said blades being of identical lead and hand, the blades of one roller being meshed in the companion troughs formed between the blades on the adjacent roller.

2. An earth pulverizer comprising the combination of: a main frame having spaced side members; a plurality of rollers journaled therein with their axes parallel; a plurality of spaced helically disposed blades or ribs carried by each of said rollers, all of said blades being of identical lead and hand, the blades of one roller being meshed in the companion troughs formed between the blades on the adjacent roller; and means operably connecting the rollers for synchronizing their rotation.

3. An earth pulverizer comprising the combination of: a main frame having spaced side members; a plurality of rollers journaled therein with their axes parallel; a plurality of spaced helically disposed blades or ribs carried by each of said rollers, all of said blades being of identical lead and hand, the blades of one roller being meshed in the companion troughs formed between the blades on the adjacent roller; sprockets on the respective rollers; and a chain connecting the sprockets on each adjacent pair of rollers for synchronizing their rotation.

4. An earth pulverizer comprising the combination of: a main frame having spaced side members; a plurality of rollers journaled therein with their axes parallel; a plurality of spaced helically disposed blades or ribs carried by each of said rollers, all of said blades being of identical lead and hand, the blades of one roller being meshed in the companion troughs formed between the blades on the adjacent roller; a scraper support mounted crossways of the frame adjacent the rearmost roller; and a plurality of petal type scraper wheels mounted on said support so that their plane of rotation is normal to the tangent to the blade helices of the adjacent roller, the petals of said scraper wheels being adapted to mesh in and clean the troughs between the blades on the adjacent roller, and to be rotated by the roller blades as the roller rotates.

5. An earth pulverizer comprising the combination of: a main frame having spaced side members; a plurality of rollers journaled therein with their axes parallel; a plurality of spaced helically disposed blades or ribs carried by each of said rollers, all of said blades being of identical lead and hand, the blades of one roller being meshed in the companion troughs formed between the blades on the adjacent roller; means operably connecting the rollers for synchronizing their rotation; a scraper support mounted crossways of the frame adjacent the rearmost roller; and a plurality of petal type scraper wheels mounted on said support so that their plane of rotation is normal to the tangent to the blade helices of the adjacent roller, the petals of said scraper wheels being adapted to mesh in and clean the troughs between the blades on the adjacent roller, and to be rotated by the roller blades as the roller rotates.

NOAH ELLSWORTH WOLFARD.